(12) United States Patent
Murphy et al.

(10) Patent No.: US 9,995,180 B2
(45) Date of Patent: *Jun. 12, 2018

(54) NON-CIRCULAR AFT NACELLE COWLING GEOMETRY

(71) Applicant: United Technologies Corporation, Hartford, CT (US)

(72) Inventors: Michael J. Murphy, Windsor, CT (US); Robert E. Malecki, Storrs, CT (US)

(73) Assignee: United Technologies Corporation, Framington, CT (US)

( * ) Notice: Subject to any disclaimer, the term of this patent is extended or adjusted under 35 U.S.C. 154(b) by 450 days.

This patent is subject to a terminal disclaimer.

(21) Appl. No.: 14/676,354

(22) Filed: Apr. 1, 2015

(65) Prior Publication Data

US 2015/0247425 A1    Sep. 3, 2015

Related U.S. Application Data

(63) Continuation of application No. 12/851,251, filed on Aug. 5, 2010, now Pat. No. 9,057,286.

(60) Provisional application No. 61/319,049, filed on Mar. 30, 2010.

(51) Int. Cl.
| | |
|---|---|
| *F01D 25/24* | (2006.01) |
| *B64D 29/02* | (2006.01) |
| *F02C 3/10* | (2006.01) |
| *F01D 25/28* | (2006.01) |

(52) U.S. Cl.
CPC ............ *F01D 25/24* (2013.01); *B64D 29/02* (2013.01); *F02C 3/10* (2013.01)

(58) Field of Classification Search
None
See application file for complete search history.

(56) References Cited

U.S. PATENT DOCUMENTS

| | | |
|---|---|---|
| 3,243,126 A | 3/1966 | Kurti et al. |
| 3,806,067 A | 4/1974 | Kutney |
| 4,442,987 A | 4/1984 | Legrand et al. |
| 4,493,184 A | 1/1985 | Nikkanen et al. |
| 4,683,717 A | 8/1987 | Naud |
| 5,058,379 A | 10/1991 | Lardellier |
| 5,369,954 A | 12/1994 | Stuart |
| 5,575,147 A | 11/1996 | Nikkanen |
| 6,070,407 A | 6/2000 | Newton |
| 6,129,311 A | 10/2000 | Welch et al. |
| 6,868,664 B2 | 3/2005 | Albero et al. |

(Continued)

FOREIGN PATENT DOCUMENTS

WO     09058437     5/2009

*Primary Examiner* — Logan Kraft
*Assistant Examiner* — Jason Davis
(74) *Attorney, Agent, or Firm* — O'Shea Getz P.C.

(57) ABSTRACT

A nacelle for a turbofan propulsion system that extends along a centerline includes a forward cowling and an aft cowling. To improve the fit of a turbofan propulsion system in the space between the wing and ground of a fixed-wing aircraft, the aft cowling of the nacelle is modified. The aft cowling has a non-circular cross-sectional geometry disposed in a plane substantially perpendicular to the centerline. The non-circular cross-sectional geometry includes a radially recessed section disposed between first and second curved sections. The first and the second curved sections each have a radius that is greater than a radial distance between the centerline and a center point of the radially recessed section.

13 Claims, 3 Drawing Sheets

(56) References Cited

U.S. PATENT DOCUMENTS

| | | |
|---|---|---|
| 6,969,028 B2 | 11/2005 | Dun |
| 2009/0053058 A1 | 2/2009 | Kohlenberg et al. |
| 2009/0114740 A1 | 5/2009 | Zamora et al. |
| 2009/0226297 A1 | 9/2009 | Yanagi et al. |
| 2009/0320488 A1 | 12/2009 | Gilson et al. |
| 2010/0050596 A1 | 3/2010 | Winter et al. |
| 2011/0120080 A1 | 5/2011 | Schwark et al. |

NON-CIRCULAR AFT NACELLE COWLING GEOMETRY

This application claims priority to and is a continuation of U.S. patent application Ser. No. 12/851,251 filed on Aug. 5, 2010, which claims priority to U.S. Provisional Patent Application No. 61/319,049 filed Mar. 30, 2010, both of which are hereby incorporated herein by reference in their entirety.

BACKGROUND OF THE INVENTION

1. Technical Field

This disclosure relates generally to a nacelle for a turbofan engine and, more particularly, to a nacelle having a non-circular aft cowling geometry.

2. Background Information

Today, many aircraft are retrofitted to include modern turbofan propulsion systems that increase performance, while reducing costs. Such modern turbofan propulsion systems can include high or ultra-high bypass-ratio replacement turbofan engines designed to increase thrust, minimize weight and reduce noise levels and fuel consumption, and an aerodynamically streamlined nacelle. A typical high bypass engine includes a fan section, and an engine core. The nacelle includes a forward cowling disposed around the fan section, and a circular aft cowling disposed around the engine core.

Existing aircraft typically have a defined amount of space between the wing and the ground. Retrofit propulsion systems must fit within that defined amount of space without interfering with wing high-lift surfaces that articulate during operation or with access to the engine for routine maintenance. There is a need, therefore, for a nacelle that allows the installation of a high bypass-ratio turbofan engine, and one which does not interfere with articulation of wing high-lift surfaces. This is also true for the underwing installation of ultra-high bypass-ratio engines on all-new aircraft.

SUMMARY OF THE DISCLOSURE

According to a first aspect of the invention, a nacelle is provided for a turbofan propulsion system that extends along a centerline that includes a forward cowling and an aft cowling. The aft cowling has a non-circular cross-sectional geometry disposed in a plane substantially perpendicular to the centerline. The non-circular cross-sectional geometry includes a radially recessed section disposed between first and second curved sections. The first and the second curved sections each have a radius that is greater than a radial distance between the centerline and a center point of the radially recessed section.

According to a second aspect of the invention, a nacelle is provided for a turbofan propulsion system that includes a forward cowling and an aft cowling. The aft cowling axially extends from the forward cowling along a centerline. The aft cowling includes a bypass nozzle having a non-circular cross-sectional geometry disposed in a plane substantially perpendicular to the centerline. The non-circular cross-sectional geometry includes a radially recessed section disposed between first and second curved sections. The first and the second curved sections each have a radius that is greater than a radial distance between the centerline and a center point of the radially recessed section.

According to a third aspect of the invention, a turbofan propulsion system is provided that includes a turbofan engine core having a centerline and a nacelle. The nacelle is disposed around the turbofan engine core and includes a forward cowling and an aft cowling. The aft cowling has a non-circular cross-sectional geometry disposed in a plane substantially perpendicular to the centerline. The non-circular cross-sectional geometry includes a radially recessed section disposed between first and second curved sections. The first and the second curved sections each have a radius that is greater than a radial distance between the centerline and a center point of the radially recessed section.

The foregoing features and advantages and the operation of the invention will become more apparent in light of the following description and the accompanying drawings.

BRIEF DESCRIPTION OF THE DRAWINGS

FIG. 6A illustrates the VAFN in a closed position. FIG. 6B illustrates the VAFN in an open position.

DETAILED DESCRIPTION OF THE INVENTION

Figure 1:
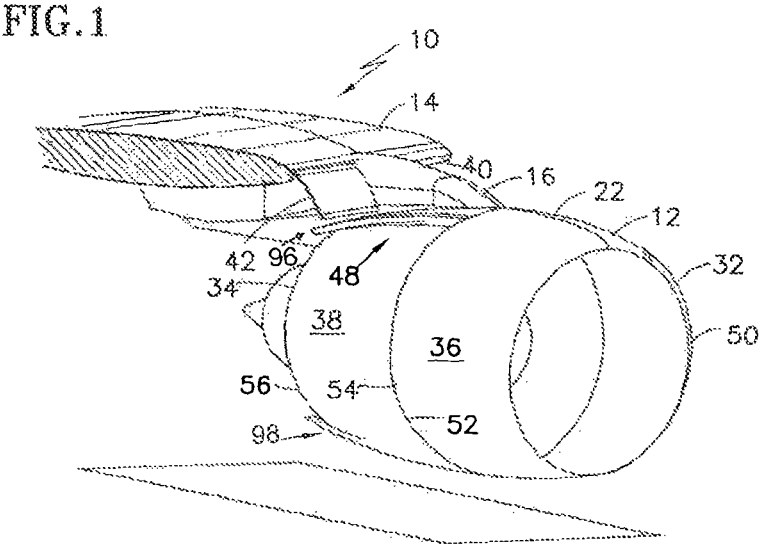
FIG. 1 is a perspective diagrammatic illustration of one embodiment of a turbofan propulsion system connected to a wing of an aircraft.
Figure 2:
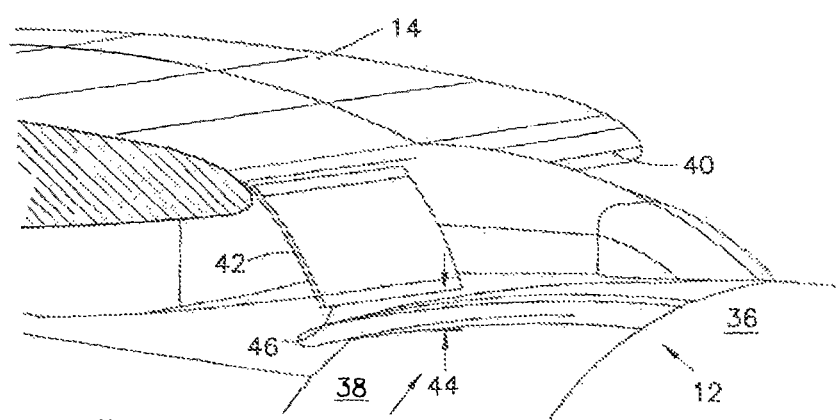
FIG. 2 is a perspective diagrammatic illustration of an enlarged section of FIG. 1 between a top portion of the turbofan propulsion system and a leading edge of the wing.
Figure 3:
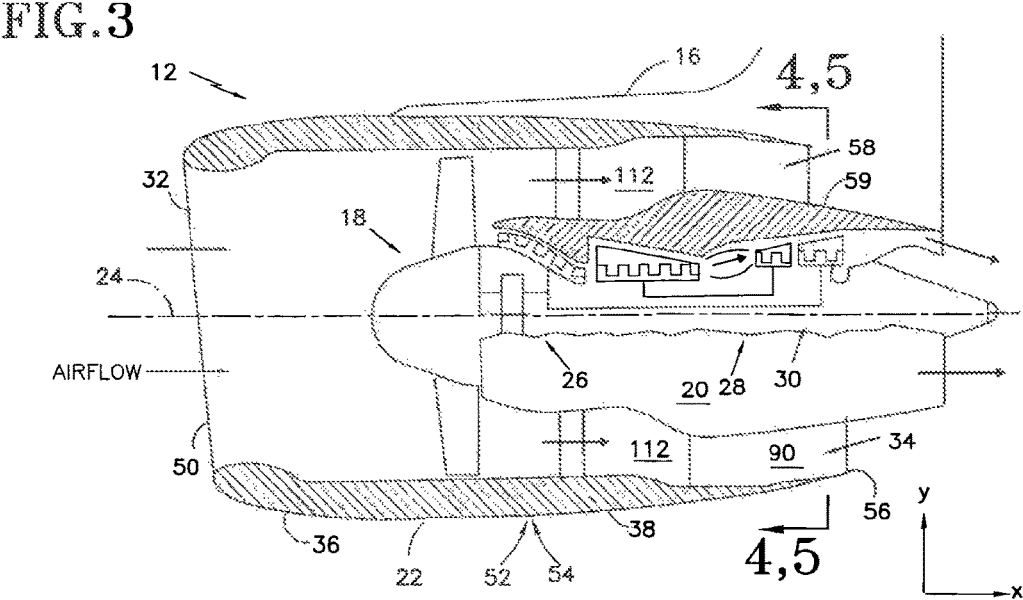
FIG. 3 is an axial-sectional diagrammatic illustration of the turbofan propulsion system in FIG. 1.

Referring to FIGS. 1 to 3, a portion of an aircraft 10 is shown that includes a turbofan propulsion system 12 (hereinafter the "propulsion system") connected to a wing 14 via an engine pylon 16. The propulsion system 12 includes a fan section 18, an engine core 20 and an aerodynamic nacelle 22. The fan section 18 and the engine core 20 are respectively disposed along a centerline 24, and are housed within the nacelle 22. The engine core 20 includes a compressor section 26, a combustor section 28 and a turbine section 30. The nacelle 22 axially extends along the centerline 24 between a forward end 32 and an aft end 34, and includes a forward cowling 36 and an aft cowling 38. The wing 14 extends between a leading edge 40 and a trailing edge (not shown), and includes at least one forward high-lift surface panel 42 (hereinafter "forward high-lift surface"). When the forward high-lift surface 42 is in a deployed position (as shown), it extends from the leading edge 40 of the wing 14 towards the propulsion system 12, defining a clearance 44 there between. Referring to FIG. 2, the clearance 44 is measured as a distance between the forward high-lift surface 42 and the nacelle 22, and in particular, between a leading edge 46 of the forward high-lift surface 42 and a top portion of an intermediate region 48 of the aft cowling 38. As will be described below in further detail, the nacelle 22 can be configured such that this clearance 44 is sized greater than or equal to a predetermined minimum value.

The forward cowling 36 is axially aligned with the fan section 18 of the propulsion system 12, and extends between a forward end 50 (i.e., the forward end of the nacelle 22) and an aft end 52. In an exemplary embodiment, the forward and the aft ends 50 and 52 each have a circular cross-sectional geometry. Alternatively, the forward and/or the aft ends 50, 52 can each have a non-circular cross-sectional geometry (e.g., oval, elliptical, elongated-circular, etc.).

The aft cowling 38 is axially aligned with the engine core 20, and extends between a forward end 54 and an aft end 56 (i.e., the aft end of the nacelle 22). The forward end 54 is connected to, and has the same cross-sectional geometry (e.g., a circular cross-sectional geometry) as the aft end 52 of the forward cowling 36. The aft end 56 has a non-circular cross-sectional geometry (hereinafter "non-circular geometry"), and forms a bypass nozzle 58 with the core nacelle 59 disposed radially inside thereof. The bypass nozzle 58 can be configured substantially perpendicular to (see FIG. 1) or offset from (see FIG. 3) the centerline 24. As the aft cowling 38 extends between its forward and its aft ends 54 and 56, its cross-sectional geometry transitions between these two respective end geometries. In the embodiment in FIG. 1, this transition occurs, for example, gradually such that the intermediate region 48 of the aft cowling 38 also has a substantially non-circular cross-sectional geometry. Thus, the clearance 44 between the leading edge 46 of the forward high-lift surface 42 and the top portion of the intermediate region 48 of the aft cowling 38 is a function of the forward and the aft end geometries 54, 56. Here, the intermediate region 48 of the aft cowling 38 is axially aligned with the leading edge 46 of the forward high-lift surface 42 (in the deployed position). The present invention, however, is not limited to the aforesaid configuration.

Figure 4:
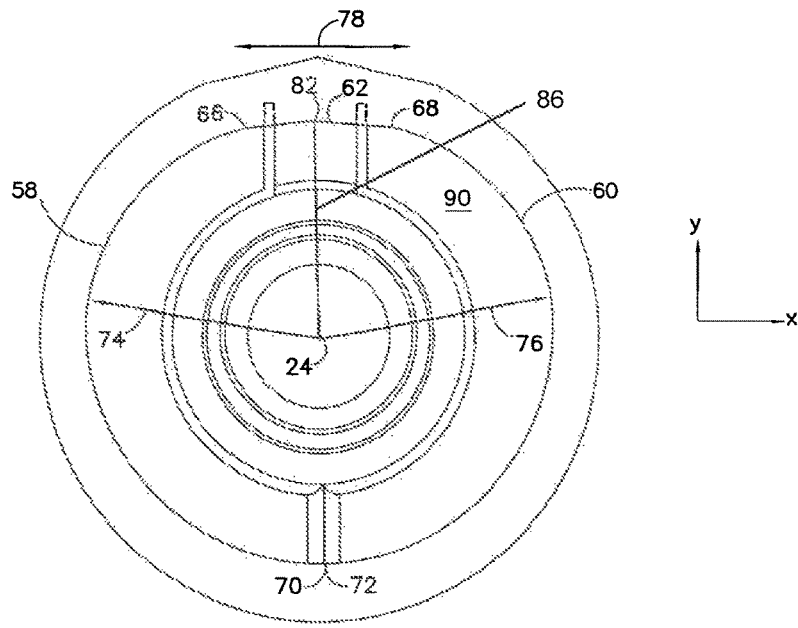
FIG. 4 is a cross-sectional diagrammatic illustration of one embodiment of an aft nacelle cowling of the turbofan propulsion system in FIG. 1.
Figure 5:
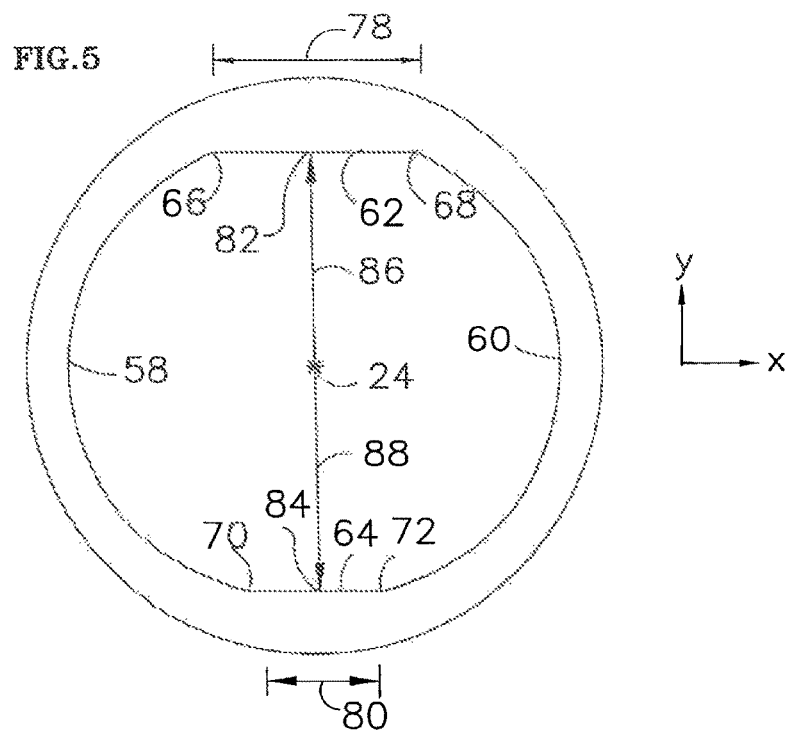
FIG. 5 is a cross-sectional diagrammatic illustration of another embodiment of the aft nacelle cowling of the turbofan propulsion system in FIG. 1.

Referring to FIGS. 4 and 5, the non-circular geometry of the aft end 56 of the aft cowling 38 is disposed in a plane substantially perpendicular to the centerline 24 (i.e., substantially parallel to an x-y plane). The non-circular internal geometry includes first and second curved sections 58 and 60 and one or more radially recessed sections 62, 64 (hereinafter "recessed sections"). Each curved section 58, 60 extends circumferentially between a first end 66, 68 (e.g., a top end) and a second end 70, 72 (e.g. a bottom end), and has a radius 74, 76 (see FIG. 4). In the embodiment in FIG. 4, the bottom ends 70, 72 of the first and the second curved sections 58, 60 are connected; however, the present invention is not limited to this configuration. The radius 74, 76 (see FIG. 4) can be fixed or varied depending on the geometry of the respective curved section 58, 60. For example, a curved section having a circular segmented geometry has a fixed radius, whereas a curved section having, for example, an elliptical segmented geometry has a varied radius.

Each recessed section 62, 64 extends between the respective end 66, 70 of the first curved section 58 and the respective end 68, 72 of the second curved section 60. Each recessed section 62, 64 has a length 78, 80, and a center point 82, 84 disposed a radial distance 86, 88 from the centerline 24. This radial distance 86, 88 (between the respective recessed section 62, 64 and the centerline 24) is less than either radius 74, 76 of the first or second curved sections 58, 60. Referring now to FIGS. 1 and 4, the radial distance 86 can be sized to set the clearance 44 between the leading edge 46 of the forward high-lift surface 42 and the top portion of the intermediate region 48 of the aft cowling 38 since, as set forth above, this clearance 44 is a function of the aft end geometry of the aft cowling 38. Under the present invention, the bypass nozzle 58 flow area is not limited by the radial distance 86, however. A desirable amount of bypass nozzle 58 flow area can be created by increasing the length 78 of the recessed section 62.

Referring to the specific embodiment in FIG. 5, the non-circular geometry of the aft end 56 of the aft cowling 38 includes the first and the second curved sections 58 and 60, and first and second recessed sections 62 and 64. The first and the second curved 58 and 60 sections are diametrically disposed on opposite sides of the centerline 24, and each has a substantially circular segmented geometry. The first recessed section 62 has a substantially straight geometry that extends between the top ends 66 and 68 of the first and the second curved sections 58 and 60. The second recessed section 64 has a substantially straight geometry that extends between the bottom ends 70 and 72 of the first and the second curved sections 58 and 60. These recessed sections 62 and 64, however, are not limited to the aforesaid straight geometries. For example, the first and/or the second recessed sections 62, 64 can have non-circular curved or compounded (see FIG. 4) geometries. The radial distance 88 between the centerline 24 and the second recessed section 64 is greater than the radial distance 86 between the centerline 24 and the first recessed section 62. The length 78 of the first recessed section 62 is greater than the length 80 of the second recessed section 64. The present invention, however, is not limited to the aforesaid configuration.

Figure 6A:
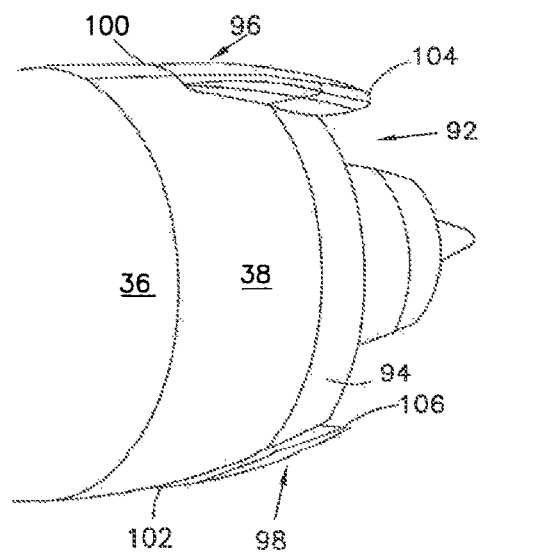
FIGS. 6A and 6B are perspective diagrammatic illustrations of an embodiment of the turbofan propulsion system in FIG. 1 that includes a variable area fan nozzle ("VAFN").
Figure 6B:
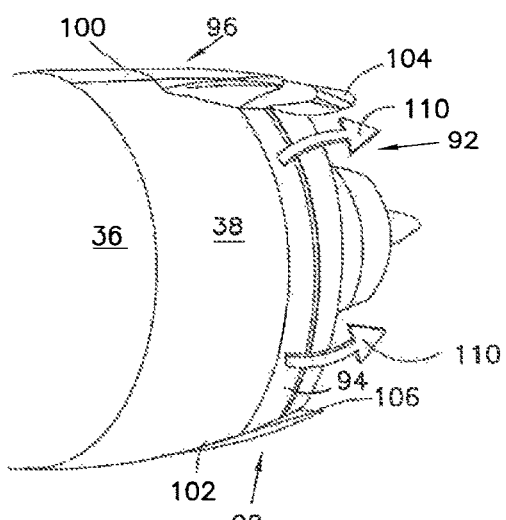

Referring to the embodiment in FIGS. 6A and 6B, the bypass nozzle 58 can be configured as a variable area fan nozzle 92 (or "VAFN"). In this configuration, the VAFN 92 includes a set of nozzle panels 94 that are adapted to slide aftwards along a set of track fairings 96 and 98. Each track fairing 96, 98 extends axially between a forward end 100, 102 and an aft end 104, 106. A first one 96 of the track fairings is disposed on the top portion of the aft cowling 38, and is circumferentially aligned between the first and the second curved section 58 and 60 of the bypass nozzle 58. A second one 98 of the track fairings is disposed on a bottom portion of the aft cowling 38, and is circumferentially aligned between the first and the second curved sections 58 and 60 of the bypass nozzle 58. Referring to FIG. 6B, in some embodiments, VAFN 92 further includes an auxiliary port 108 that exhausts airflow 110 from a bypass flow path 112 (see FIG. 3) when the nozzle panels 94 are disposed in the deployed position. Examples of suitable VAFNs are disclosed in U.S. Patent Publication Nos. US 2009/0053058 to Kohlenberg et al. and US 2009/0320488 to Gilson et al., which are hereby incorporated by reference in their entirety. Another example of a suitable VAFN is disclosed in U.S. Pat. No. 5,778,659 to Duesler et al. The bypass nozzle 58, however, is not limited to any particular VAFN configuration.

While various embodiments of the present invention have been disclosed, it will be apparent to those of ordinary skill in the art that many more embodiments and implementations are possible within the scope of the invention. For example, the afore-described nacelle can further include any suitable type of thrust reversers (e.g., cascaded thrust reversers). An example of a suitable cascaded thrust reverser is disclosed in U.S. Pat. No. 5,575,147 to Nikkanen, which is hereby incorporated by reference in its entirety. Accordingly, the present invention is not to be restricted except in light of the attached claims and their equivalents.

What is claimed is:
1. A nacelle for a turbofan propulsion system that extends along a centerline, comprising:
   a forward cowling; and
   an aft cowling having a non-circular cross-sectional geometry disposed in a plane substantially perpendicular to the centerline, which non-circular cross-sectional geometry includes a first radially recessed section disposed between first and second curved sections;
wherein the first and the second curved sections each have a radius that is greater than a radial distance between the centerline and a center point of the first radially recessed section;
wherein the first and the second curved sections each have a non-circular geometry;
wherein the first and the second curved sections each extend between first and second ends, the first and the second curved sections each are continuously curved between the first and the second ends, and the first radially recessed section extends between the first ends of the first and the second curved sections;
wherein the first radially recessed section is at a top end of the aft cowling, and the first radially recessed section has a compound cross-sectional geometry.

2. A nacelle for a turbofan propulsion system, comprising:
a forward cowling; and
an aft cowling axially extending from the forward cowling along a centerline, which aft cowling includes a bypass nozzle having a non-circular cross-sectional geometry disposed in a plane substantially perpendicular to the centerline, which non-circular cross-sectional geometry includes a first radially recessed section disposed between first and second curved sections;
wherein the first and the second curved sections each have a radius that is greater than a radial distance between the centerline and a center point of the first radially recessed section;
wherein the first and the second curved sections each have a non-circular geometry;
wherein the first and the second curved sections each extend between first and second ends, the first and the second curved sections each are continuously curved between the first and the second ends, and the first radially recessed section extends between the first ends of the first and second curved sections;
wherein the first radially recessed section is configured to be substantially circumferentially aligned with a pylon for mounting the turbofan propulsion system; and
wherein the first radially recessed section has a compound cross-sectional geometry.

3. The nacelle of claim 2, wherein the aft cowling further includes an intermediate region having a substantially non-circular cross-sectional geometry disposed in a plane perpendicular to the centerline.

4. The nacelle of claim 2, wherein the bypass nozzle is configured as a variable area fan nozzle that includes a plurality of nozzle panels that slide along a plurality of track fairings.

5. The nacelle of claim 4, wherein
a first one of the track fairings is disposed on a top portion of the aft cowling, and is circumferentially aligned between the first and the second curved sections of the non-circular cross-sectional geometry; and
a second one of the track fairings is disposed on a bottom portion of the aft cowling, and is circumferentially aligned between the first and the second curved sections of the non-circular cross-sectional geometry.

6. A turbofan propulsion system, comprising:
an engine core having a centerline; and
a nacelle disposed around the engine core, which nacelle includes:
a forward cowling; and
an aft cowling having a non-circular cross-sectional geometry disposed in a plane substantially perpendicular to the centerline, which non-circular cross-sectional geometry includes a first radially recessed section disposed between first and second curved sections;
wherein the first and the second curved sections each have a radius that is greater than a radial distance between the centerline and a center point of the first radially recessed section;
wherein the first and the second curved sections each have a non-circular geometry;
wherein the first and the second curved sections each extend between first and second ends, wherein the first and the second curved sections each are continuously curved between the first and the second ends, wherein the first radially recessed section extends between the first ends of the first and the second curved sections;
wherein the first radially recessed section is at a top end of the aft cowling and has a compound cross-sectional geometry.

7. The propulsion system of claim 6, wherein the aft cowling further includes an intermediate region having a substantially non-circular cross-sectional geometry disposed in a plane perpendicular to the centerline.

8. The propulsion system of claim 6, wherein the aft cowling includes a variable area fan nozzle that includes a plurality of nozzle panels that slide along a plurality of track fairings.

9. The propulsion system of claim 8, wherein
a first one of the track fairings is disposed on a top portion of the aft cowling, and is circumferentially aligned between the first and the second curved sections of the non-circular cross-sectional geometry; and
a second one of the track fairings is disposed on a bottom portion of the aft cowling, and is circumferentially aligned between the first and the second curved sections of the non-circular cross-sectional geometry.

10. A nacelle for an aircraft propulsion system, comprising:
a forward cowling extending along a centerline, the forward cowling having a cross-sectional geometry disposed in a first plane substantially perpendicular to the centerline; and
an aft cowling having a non-circular cross-sectional geometry disposed in a second plane substantially perpendicular to the centerline, wherein the non-circular cross-sectional geometry includes a radially recessed section disposed between a pair of opposing side curved sections;
wherein each of the side curved sections has a radius that is greater than a radial distance between the centerline and a center point of the radially recessed section;
wherein the radius of a first of the side curved sections is a variable radius;
wherein each of the side curved sections extends between a first end and a second end, each of the side curved sections is continuously curved between its respective first and second ends, and the radially recessed section extends between the first ends of the side curved sections;
wherein the radially recessed section has a cross-sectional geometry with a variable radius, and the radially recessed section is configured at a top end of the aft cowling; and
wherein the cross-sectional geometry of the forward cowling is different than the non-circular cross-sectional geometry of the aft cowling.

11. The nacelle of claim 10, wherein the aft cowling further includes an intermediate region having a substantially non-circular cross-sectional geometry disposed in a plane perpendicular to the centerline.

12. A nacelle for an aircraft propulsion system, comprising:
- a forward cowling extending along a centerline; and
- an aft cowling having a non-circular cross-sectional geometry disposed in a plane substantially perpendicular to the centerline, wherein the non-circular cross-sectional geometry includes a radially recessed section disposed between a pair of opposing side curved sections;
- wherein each of the side curved sections has a radius that is greater than a radial distance between the centerline and a center point of the radially recessed section;
- wherein the radius of a first of the side curved sections is a variable radius;
- wherein each of the side curved sections extends between a first end and a second end, each of the side curved sections is continuously curved between its respective first and second ends, and the radially recessed section extends between the first ends of the side curved sections; and
- wherein the radially recessed section has a cross-sectional geometry with a variable radius, and the cross-sectional geometry of the radially recessed section is a compound cross-sectional geometry.

13. A nacelle for an aircraft propulsion system, comprising:
- a forward cowling extending along a centerline, the forward cowling having a cross-sectional geometry disposed in a first plane substantially perpendicular to the centerline; and
- an aft cowling having a non-circular cross-sectional geometry disposed in a second plane substantially perpendicular to the centerline, wherein the non-circular cross-sectional geometry includes a radially recessed section disposed between a pair of opposing side curved sections;
- wherein each of the side curved sections has a radius that is greater than a radial distance between the centerline and a center point of the radially recessed section;
- wherein the radius of a first of the side curved sections is a variable radius;
- wherein each of the side curved sections extends between a first end and a second end each of the side curved sections is continuously curved between its respective first and second ends, and the radially recessed section extends between the first ends of the side curved sections;
- wherein the radially recessed section has a cross-sectional geometry with a variable radius, the radially recessed section is configured at a bottom end of the aft cowling; and
- wherein the cross-sectional geometry of the forward cowling is different than the non-circular cross-sectional geometry of the aft cowling.

* * * * *